(12) United States Patent
Journet

(10) Patent No.: US 10,067,550 B2
(45) Date of Patent: Sep. 4, 2018

(54) MULTI-PHASE CLOCK METHOD AND CIRCUIT FOR DYNAMIC POWER CONTROL IN A DATA PROCESSING PIPELINE

(71) Applicant: STMicroelectronics (Alps) SAS, Grenoble (FR)

(72) Inventor: Fabien Journet, Grenoble (FR)

(73) Assignee: STMicroelectronics (ALPS) SAS, Grenoble (FR)

( * ) Notice: Subject to any disclaimer, the term of this patent is extended or adjusted under 35 U.S.C. 154(b) by 45 days.

(21) Appl. No.: 15/253,012

(22) Filed: Aug. 31, 2016

(65) Prior Publication Data

US 2018/0004270 A1     Jan. 4, 2018

(30) Foreign Application Priority Data

Jun. 29, 2016  (FR) .................................... 16 56052

(51) Int. Cl.
| | |
|---|---|
| *G06F 1/32* | (2006.01) |
| *G06F 9/38* | (2018.01) |
| *H04B 5/00* | (2006.01) |
| *G06F 1/06* | (2006.01) |

(52) U.S. Cl.
CPC ............... *G06F 1/324* (2013.01); *G06F 1/06* (2013.01); *G06F 9/3869* (2013.01); *H04B 5/0037* (2013.01)

(58) Field of Classification Search
CPC ....... G06F 1/3237; G06F 9/3869; G06F 1/324
See application file for complete search history.

(56) References Cited

U.S. PATENT DOCUMENTS

| | | | |
|---|---|---|---|
| 2004/0068640 A1* | 4/2004 | Jacobson | G06F 1/3203 712/220 |
| 2007/0165747 A1 | 7/2007 | May et al. | |
| 2007/0294548 A1 | 12/2007 | Jacobson et al. | |
| 2008/0043890 A1 | 2/2008 | Arsovski et al. | |
| 2017/0062075 A1* | 3/2017 | Barber | G11C 29/12015 |

OTHER PUBLICATIONS

Search Report for FR 1656052, dated Apr. 13, 2017 (1 page).
(Continued)

*Primary Examiner* — Albert C Wang
(74) *Attorney, Agent, or Firm* — Seed IP Law Group LLP

(57) ABSTRACT

Dynamic power control embodiments concern a data processing pipeline. First and second pipeline stages respectively receive first and second clock signals. The first and second pipeline stages are configured to perform first and second operations respectively triggered by first timing edges of the first clock signal and second timing edges of the second clock signal. A clock controller is configured to generate the first and second clock signals. The clock controller is capable of operating in a first mode in which, during a first data processing cycle of the data processing pipeline, a first of the first timing edges is in-phase with a first of the second timing edges. The clock controller is also capable of operating in a second mode in which, during a second data processing cycle of the data processing pipeline, a second of the first timing edges is out of phase with a second of the second timing edges.

16 Claims, 12 Drawing Sheets

(56) References Cited

OTHER PUBLICATIONS

Jacobson et al., "Synchronous Interlocked Pipelines," IEEE, Proceedings of the Eighth International Symposium on Asynchronous Circuits and Systems (ASYNC'02), Apr. 8, 2002, XP008037946, 10 pgs.
Toosizadeh et al., "VariPipe: Low-overhead Variable-clock Synchronous Pipelines," IEEE, International Conference on Computer Design, 2009 (ICCD), Oct. 4, 2009, XP031627992, 8 pgs.
Search Report for EP 16 20 0665, dated Jul. 21, 2017 (2 pages).

* cited by examiner

| FSM | C1 | C2 | C3 | C4 | C5 |
|---|---|---|---|---|---|
| | DO_A | DO_B | | | IF(A=?) |
| CMD | | CMD_A | CMD_B | | |
| CALC | | | CALC_A | CALC_B | |
| RES | | | | RES_A | RES_B |

*FIG. 7A*

| FSM | | | | | IF(A=?) | | |
|---|---|---|---|---|---|---|---|
| | DO_A | DO_B | | | | | |
| CMD | CMD_A | | CMD_B | | | | |
| CALC | | CALC_A | | CALC_B | | | |
| RES | | | RES_A | | RES_B | | |

| FSM | DO_A | DO_B | CMD_B | IF(A=?) | |
|---|---|---|---|---|---|
| | C1 | C2 | C3 | C4 | C5 |
| CMD | | CMD_A | CMD_B | | |
| | C1 | C2 | C3 | C4 | C5 |
| CALC | | | CALC_A | CALC_B | |
| | | C2 | C3 | C4 | C5 |
| RES | | | | RES_A | RES_B |
| | | C2 | C3 | C4 | C5 | C6 |

| FSM | DO_A | | DO_B | IF(A=?) | |
|---|---|---|---|---|---|
| | C1 | C2 | C3 | C4 | C5 |
| CMD | | CMD_A | | CMD_B | |
| | C1 | C2 | C3 | C4 | C5 |
| CALC | | | CALC_A | CALC_A | CALC_B |
| | | C2 | C3 | C4 | C5 |
| RES | | | | RES_A | RES_B |
| | | C2 | C3 | C4 | C5 | C6 |

PH1 PH2 PH3 PH4

MULTI-PHASE CLOCK METHOD AND CIRCUIT FOR DYNAMIC POWER CONTROL IN A DATA PROCESSING PIPELINE

BACKGROUND

Technical Field

The present disclosure relates to the field of power control, and in particular to a method and circuit for dynamic power control in a data processing pipeline.

Description of the Related Art

In synchronous data processing pipelines, each stage in the pipeline performs its corresponding operation on each significant edge of the clock signal, causing data to propagate through the pipeline. An advantage of such synchronous pipelines is that they allow relatively high data processing rates, as this rate is only limited by the data processing time of each stage and not by the overall propagation delay of the pipeline. However, such a synchronous operation can have drawbacks in certain applications.

For example, in the field of NFC (near-field communications), an RF card is powered by the RF field generated by the NFC reader, and modulates the RF field in order to transmit data back to the reader. If the RF field is weak, the RF card may reduce its clock rate in order to reduce its power consumption. However, the current consumption of data processing pipelines within the RF card will have current consumption peaks occurring on each significant clock edge, and at low frequencies, it may not be possible to smooth these peaks. This can lead to the current consumption of the RF card being visible at the card antenna, which may disrupt communication between the card and the reader.

Furthermore, side channel attacks against secure devices such as encryption or decryption circuits use powerful correlation techniques based on power consumption to try to determine the data being processed by the data processing pipeline. Synchronous pipelines do not provide sufficient protection against such attacks.

The subject matter discussed in the Background section is not necessarily prior art and should not be assumed to be prior art merely as a result of its discussion in the Background section. Along these lines, the recognition of one or more problems in the prior art discussed in the Background section and the subject matter associated therewith should not be treated as prior art unless expressly stated to be prior art. Instead, the discussion in the Background section encompassing one or more recognized problems in the prior art should be treated as part of the inventor's approach to the particular problem, which in and of itself may also be inventive.

BRIEF SUMMARY

It is an aim of embodiments of the present description to at least partially address one or more problems in the prior art.

According to one aspect, there is provided a data processing pipeline comprising: a first pipeline stage receiving a first clock signal and configured to perform a first operation triggered by first timing edges of the first clock signal; a second pipeline stage receiving a second clock signal and configured to perform a second operation triggered by second timing edges of the second clock signal; and a clock controller (402) configured to generate the first and second clock signals, wherein the clock controller is capable of operating: in a first mode in which, during a first data processing cycle of the data processing pipeline, a first of the first timing edges is in-phase with a first of the second timing edges; and in a second mode in which, during a second data processing cycle of the data processing pipeline, a second of the first timing edges is out of phase with a second of the second timing edges.

According to one embodiment, the clock controller is configured to generate the first and second clock signals based on a master clock signal.

According to one embodiment, in the first mode, the clock controller is configured to select a first timing edge of the master clock signal to form the first of the first and second timing edges; and when in the second mode, the clock controller is configured to select a second timing edge of the master clock signal to form the second of the first timing edges of the first clock signal and to select a third timing edge of the master clock signal to form the second of the second timing edges of the second clock signal.

According to one embodiment, the clock controller comprises a computation circuit adapted to generate: a first enable signal for selecting the second timing edge of the master clock signal to form the second of the first timing edges of the first clock signal; and a second enable signal for selecting the third timing edge of the master clock signal to form the second of the second timing edges of the second clock signal.

According to one embodiment, the computation circuit is adapted to generate current values of the first and second enable signals based on previous values of the first and second enable signals and based on the clock division factor.

According to one embodiment, in the second mode, the clock controller is adapted to spread the second data processing cycle over n clock phases, where n is between 2 and p, where p is the number of pipeline stages in the data processing pipeline.

According to one embodiment, the first pipeline stage comprises an output coupled to an input of the second pipeline stage, and wherein during the second data processing cycle of the data processing pipeline the clock controller is adapted to generate the second of the first timing edges of the first clock signal occurring at a first time instant and the second of the second timing edges of the second clock signal occurring at a second time instant earlier than the first time instant.

According to a further aspect, there is provided an NFC card comprising the above data processing pipeline wherein the clock controller is further adapted to control the clock period of the first and second clock signals based on the available power to the NFC card.

According to a further aspect, there is provided a cryptographic circuit comprising the above data processing pipeline, wherein during the second data processing cycle, a first j stages of the pipeline receive the first clock signal, and a second k stages of the pipeline receive the second clock signal, and during a third data processing cycle, a first l stages of the pipeline receive the first clock signal, and a second m stages of the pipeline receive the second clock signal, where j, k, l and m are each integers equal to 1 or more, and j and l are non-equal.

According to a further aspect, there is provided a modular arithmetic hardware accelerator comprising the above data processing pipeline, wherein the first and second pipeline stages implement a multiplication operation.

According to yet a further aspect, there is provided a multi-core processor comprising: a first core comprising a first of the above data processing pipeline; a second core comprising a second of the above data processing pipeline;

and a clock control circuit configured to supply a first master clock signal to the first core and a second master clock signal to the second core, wherein at least some of the clock edges of the first and second master clock signals are out of phase with each other.

According to yet a further aspect, there is provided a method of circuit conception of a data processing pipeline, the method comprising generating a circuit design of the data processing pipeline to comprise: a first pipeline stage configured to perform a first operation triggered by first timing edges of a first clock signal; a second pipeline stage configured to perform a second operation triggered by second timing edges of a second clock signal independent of the first clock signal; and a clock controller configured to generate the first and second clock signals, wherein the clock controller is capable of operating: in a first mode in which, during a first data processing cycle of the data processing pipeline, a first of the first timing edges is in-phase with a first of the second timing edges; and in a second mode in which, during a second data processing cycle of the data processing pipeline, a second of the first timing edges is out of phase with a second of the second timing edges.

According to one embodiment, generating the circuit design of the data processing pipeline comprises modifying an initial circuit design of the data processing pipeline by splitting an initial pipeline stage into first and second parallel pipeline sub-stages.

According to one embodiment, generating the circuit design of the data processing pipeline further comprises generating the circuit design to comprise one or more further pipeline stages clocked by corresponding independent clock signals, wherein the number of independent clock signals in the circuit design is greater than the number of pipeline stages of the initial circuit design.

According to a further aspect, there is provided a method of dynamically controlling a data processing pipeline comprising: generating, by a clock controller, first and second clock signals; providing the first clock signal to a first pipeline stage configured to perform a first operation triggered by first timing edges of the first clock signal; providing the second clock signal to a second pipeline stage configured to perform a second operation triggered by second timing edges of the second clock signal; wherein the clock controller is capable of operating: in a first mode in which, during a first data processing cycle of the data processing pipeline, one or more of the first timing edges are in phase with one or more of the second timing edges; and in a second mode in which, during a second data processing cycle of the data processing pipeline, one or more of the first timing edges are out of phase with respect to one or more of the second timing edges.

According to a further aspect, there is provided a multi-core processing device comprising: a first processing core receiving a first clock signal and configured to perform operations triggered by first timing edges of the first clock signal; a second processing core receiving a second clock signal and configured to perform operations triggered by second timing edges of the second clock signal; and a clock controller configured to generate the first and second clock signals, wherein the clock controller is capable of operating in at least first and second modes, wherein in the first mode a first of the first timing edges is in-phase with a first of the second timing edges; and in the second mode a second of the first timing edges is out of phase with a second of the second timing edges.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. One or more embodiments are described hereinafter with reference to the accompanying drawings. The foregoing and other features and advantages will become apparent from the following detailed description of embodiments, given by way of illustration and not limitation with reference to the accompanying drawings, in which:

FIGS. 7A to 7D are diagrams representing the execution times of operations in the pipeline of FIG. 4 according to an example embodiment;

DETAILED DESCRIPTION

The term "connected" is used herein to designate a direct electrical connection between circuit elements, whereas the term "coupled" is used herein to designate an electrical connection that may be direct, or may be via one or more intermediate components such as resistors, capacitors, transistors, etc.

Figure 1A:
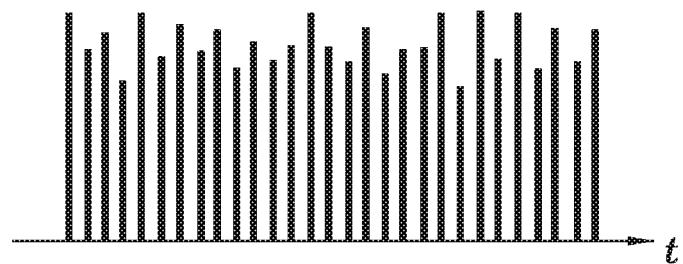
FIGS. 1A and 1B are graphs representing current consumption in a synchronous pipeline in the case of a relatively high clock frequency.

FIG. 1A is a graph illustrating an example of current consumption in a synchronous pipeline assuming a relatively high clock frequency. For example, the synchronous pipeline forms part of an integrated circuit of an RF card for use in NFC communications. It can be seen that the current consumption is in the form of spikes that occur on each rising edge of the clock signal.

Figure 1B:
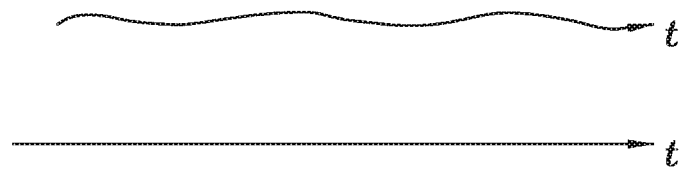

FIG. 1B illustrates the current consumption of the supply circuit that supplies the synchronous pipeline. For example, the synchronous pipeline is supplied by an LDO (low dropout regulator). The LDO for example comprises one or more capacitors enabling it to maintain a relatively stable current consumption.

Figure 2A:
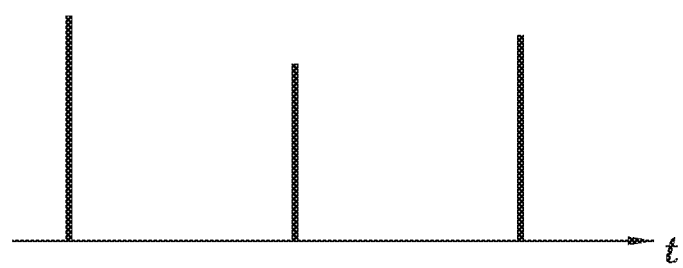
FIGS. 2A and 2B are graphs representing current consumption in a synchronous pipeline in the case of a relatively low clock frequency.

FIG. 2A is a graph illustrating the current consumption of the synchronous pipeline in the case of a relatively low clock frequency. For example, if the RF card receives a relatively weak RF field, it automatically slows its clock frequency in order to reduce its required power. Thus the peaks in current consumption occur at time intervals that are relatively spaced apart. For example, whereas in the case of FIG. 1A the clock frequency is equal to around 20 to 50 MHz, in the case of FIG. 2A the clock frequency is reduced to around one sixteenth of its initial value to reduce power consumption. More generally, the frequency of the clock signal is reduced by a factor of between 2 and 32.

Figure 2B:
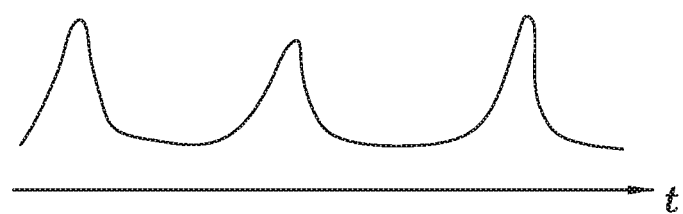

FIG. 2B illustrates the current consumption of the supply circuit that supplies the synchronous pipeline, such as the LDO. In this case, because of the relatively long time periods between the current spikes, the LDO is not able to maintain a stable current consumption, and the current consumption has peaks on each clock edge of the clock signal. Current consumption variations above the LDO are seen by the antenna of the RF card, and may thus interfere with communications between the RF card and the RF reader. For example, the RF reader may erroneously interpret the variations at the antenna as a communication attempt between the RF card and the RF reader.

Figure 3:
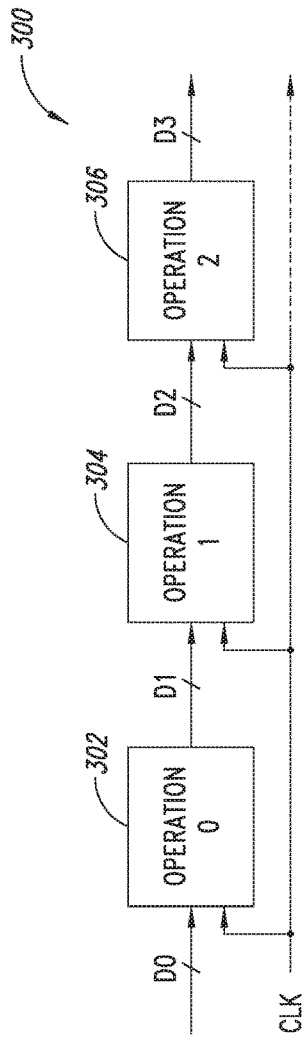
FIG. 3 schematically illustrates a synchronous pipeline.

FIG. 3 schematically illustrates an example of a synchronous pipeline 300. The pipeline 300 for example comprises three stages 302, 304, 306 coupled in series, and respectively performing operations OPERATION 0, OPERATION 1 and OPERATION 2 on input data. The stages are for example arranged in series, such that each stage receives, as input data, the output data of the previous stage. While not illustrated in FIG. 3, each pipeline stage may comprise one or more input registers to temporarily store the input data received from the previous pipeline stage before it is processed by the stage, or one or more output registers to temporarily store the output data before it is provided to the next pipeline stage. Each of the stages receives the same clock signal CLK, and thus the operations applied by each stage are for example performed at substantially the same time instant, where substantially for example implies a margin of plus or minus 5 percent of the clock period.

Figure 4:
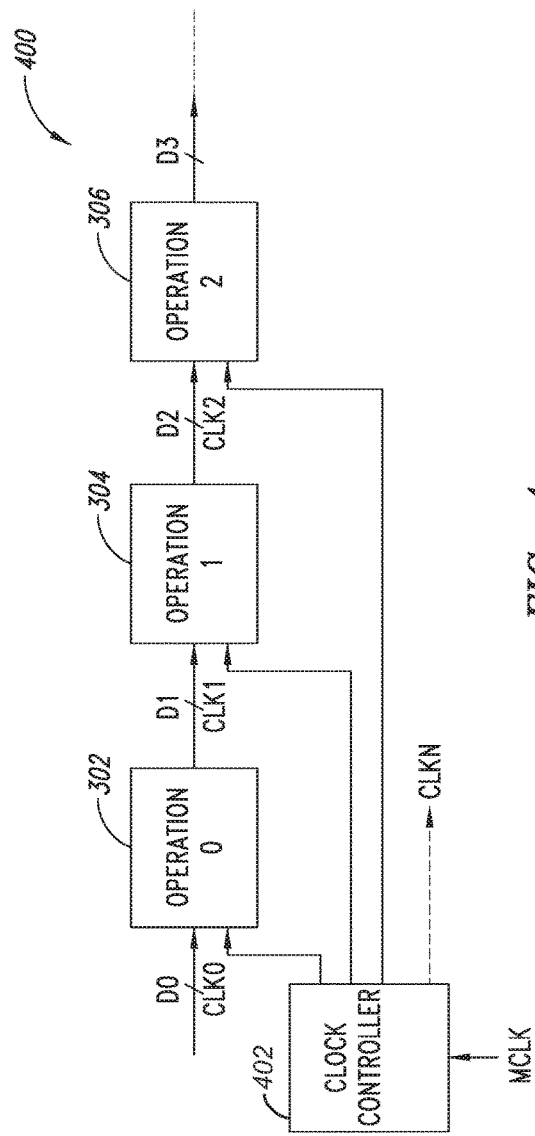
FIG. 4 schematically illustrates a data processing pipeline according to an example embodiment of the present disclosure.

FIG. 4 schematically illustrates a synchronous pipeline 400 according to an example embodiment of the present disclosure. The pipeline 400 is similar to the pipeline 300, and like features have been labelled with like reference numerals. However, in the embodiment of FIG. 4, the pipeline stages 302, 304 and 306 each receive a clock signal CLK0, CLK1 and CLK2 respectively. Each of the clock signals CLK0, CLK1 and CLK2 is for example generated by a clock controller (CLOCK CONTROLLER) 402 based on a master clock signal MCLK. Each of the clock signals is for example of the same frequency.

The clock controller 402 is for example configured to generate the clock signals CLK0 to CLKN in order to select the number of clock phases over which a data processing cycle is to be spread. For example, the clock controller 402 may generate all of the clock signals CLK0 to CLKN to have one or more in-phase edges, such that the pipeline stages operate synchronously with each other, or to spread each processing cycle over 2 or more clock phases, and up to N+1 clock phases. In some embodiments, the clock controller 402 selects the number of clock phases for each processing operation based on the available power supplying the circuit. In alternative embodiments, other criteria could be used to select the number of clock phases. For example, in the case of a cryptographic circuit for which protection against side channel attacks is to be increased, the number of clock phases could be selected in a random or pseudo-random manner.

While FIG. 4 illustrates an example in which there are three pipeline stages, in alternative embodiments there could be any plurality of pipeline stages.

Operation of the pipeline 400 of FIG. 4 will now be described in more detail with reference to the timing diagrams of FIGS. 5A and 5B.

Figure 5:
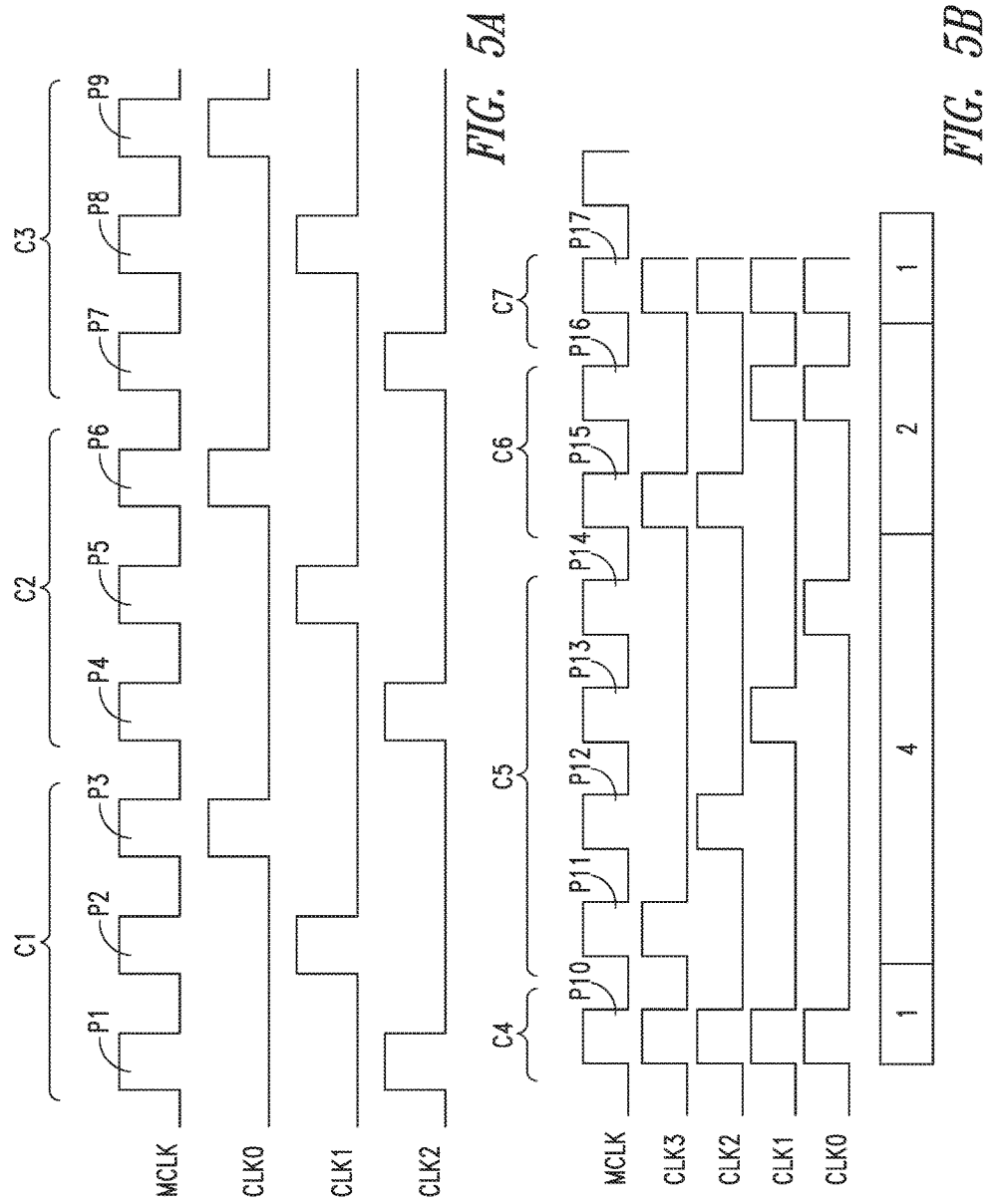
FIGS. 5A and 5B are timing diagrams representing examples of signals in the pipeline of FIG. 4.

FIG. 5A illustrates an example of the master clock signal MCLK and clock signals CLK0, CLK1 and CLK2 of FIG. 4.

In the case of the pipeline of FIG. 3, upon each significant clock edge of the clock signal CLK, each pipeline stage 302, 304, 306 will process the respective data values D0, D1, D2 present at its input and provide a result at its output. These events performed on each significant clock edge in the pipeline of FIG. 3 will be referred to herein as a processing cycle of the pipeline.

In the example of FIG. 5A, a pipeline processing cycle is spread over three consecutive periods of the master clock period MCLK. For example, the master clock signal MCLK comprises a series of high pulses P1 to P9, and the clock signal CLK0 comprises only the pulses P3, P6 and P9, the clock signal CLK1 comprises only the pulses P2, P5 and P8, and the clock signal CLK2 comprises only the pulses P1, P4 and P7. The pulses P1, P2 and P3 for example correspond to a first processing cycle C1 of the pipeline in which each pipeline stage is triggered once. Similarly, the pulses P4, P5 and P6 for example correspond to a second processing cycle C2 of the pipeline, and the pulses P7, P8 and P9 for example correspond to a third processing cycle C3 of the pipeline. Of course, while in the example of FIG. 5A positive pulses of the master clock are selected, in alternative embodiments, negative pulses could be selected. The pipeline stages could be clocked by falling and/or rising clock edges.

Each pipeline processing cycle C1, C2 and C3 is thus performed over a plurality of clock phases. In the example of FIG. 5A, the clock phases from earliest to latest are respectively applied to the stages from the last to the first of the pipeline. This choice is made in order to avoid altering the functional behavior of the data processing operations in the pipeline, as will be described in more detail below.

FIG. 5B is a timing diagram illustrating the master clock signal MCLK and clock signals CLK0 to CLK3 of FIG. 4 according to a further example of operation, assuming in this example that the pipeline comprises four stages. As illustrated in FIG. 5B, the clock controller 402 is for example capable of dynamically modifying the clock phases of each pipeline stage from one processing cycle to the next. FIG. 5B illustrates examples of four consecutive processing cycles C4 to C7.

In the processing cycles C4 and C7 of FIG. 5B, the clock signals CLK0 to CLK3 all comprise the same high pulse P10 of the master clock, and thus all the pipeline stages operate synchronously.

In a processing cycle C5, the clock signals CLK0 to CLK3 respectively comprise consecutive high pulses P11 to P14 of the master clock signal, such that the processing cycle of the pipeline is spread over four consecutive clock cycles of the master clock.

In a processing cycle C6, the clock signals CLK2 and CLK3 comprise the same high pulse P15 of the master clock, and the clock signals CLK0 and CLK1 comprise the same high pulse P16 of the master clock signal MCLK, such that the processing cycle of the pipeline is spread over two consecutive clock cycles of the master clock.

Of course, the processing cycles of FIG. 5B provide just one example, and in alternative embodiments the clock controller 402 is for example capable of dynamically selecting an operating mode for each processing cycle. The selection is for example based on the desired clock frequency, wherein the lower the frequency, the greater the number of clock phases for each processing cycle of the pipeline. In alternative embodiments, the selection may be based on other criteria, such as for power management or for security. Assuming a pipeline of p stages, each data processing operation is for example spread over up to p consecutive clock phases.

In the example of FIG. 5B, the pipeline stages are all grouped together in the processing cycle C4, and are grouped in pairs in the cycle C6. In some embodiments, a dynamic grouping of the pipeline stages could be performed from one processing cycle to the next. This is for example advantageous for security reasons, as it provides protection from side-channel attacks. For example, two clock phases could be used, and in a first processing cycle a first phase could be applied to the fourth pipeline stage while the second phase is applied to the first, second and third pipeline stages. In a subsequent processing cycle, the first phase could be applied to the third and fourth pipeline stages, while the second phase is applied to the first and second pipeline stages. In yet a further processing cycle, the first phase could be applied to the second, third and fourth pipeline stages, while the second phase is applied to the first pipeline stage. As a further example, in an eight-stage pipeline, three phases of the clock signals could be chosen to successively enable 6-1-1 pipeline stages during a first processing cycle, and 3-2-3 pipeline stages during a subsequent processing cycle. More generally, during one data processing cycle, a first j stages of the pipeline for example receive a first clock signal, and a second k stages of the pipeline for example receive a second clock signal out of phase with the first clock signal, and during a further data processing cycle, a first l stages of the pipeline for example receive the first clock signal, and a second m stages of the pipeline for example receive the second clock signal, where j, k, l and m are each integers equal to 1 or more, and j and l are non-equal.

Further, while in the embodiments of FIGS. 5A and 5B the clock pulses applied to each pipeline stage are synchronous with the master clock signal, in alternative embodiments, the phase differences between the clock signals could be less than one clock period of the master clock.

Figure 6:
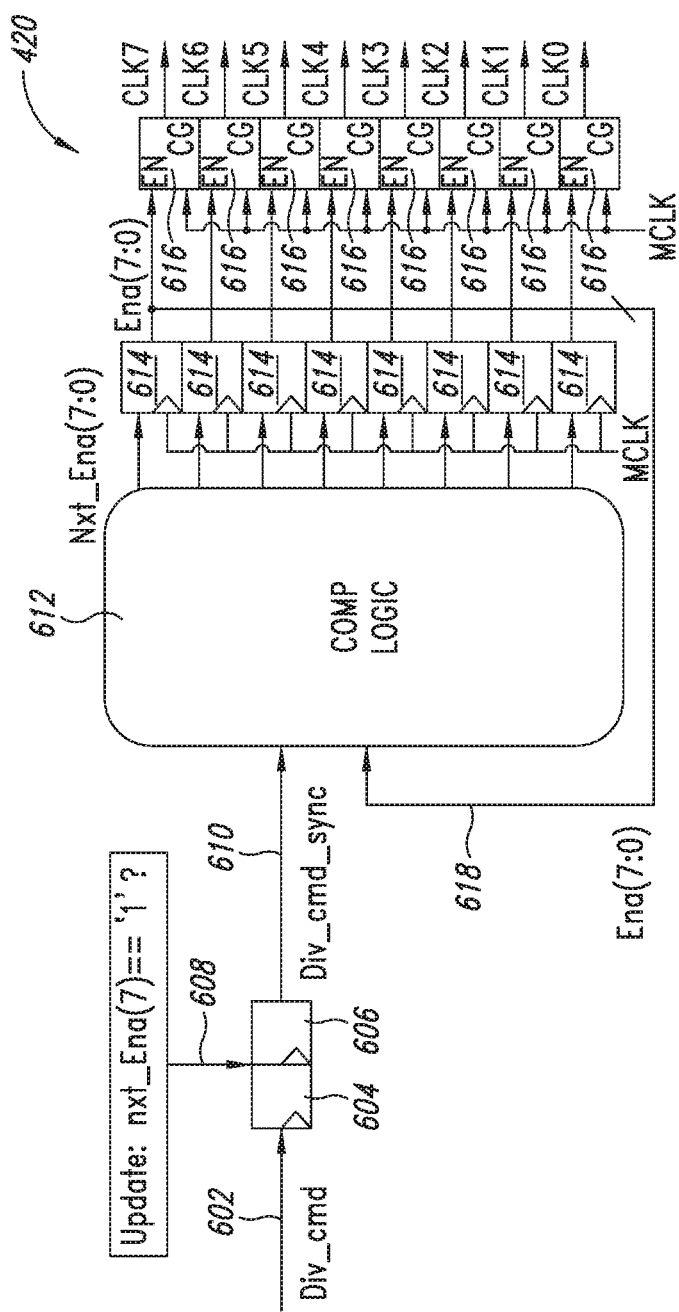
FIG. 6 schematically illustrates a clock controller of FIG. 4 in more detail according to an example embodiment.

FIG. 6 schematically illustrates the clock controller 402 of FIG. 4 in more detail according to an example embodiment.

The example of FIG. 6 is for a case in which the clock controller 420 generates eight clock signals CLK0 to CLK7. Of course, in alternative embodiments, the clock controller 420 may generate any plurality of clock signals.

The clock controller 402 for example comprises an input line 602 receiving a command signal Div_cmd indicating the number of clock cycles of the master clock that are to be used for each processing cycle of the pipeline. The line 602 is for example coupled to a series connection of a pair of flip-flops 604, 606, which for example synchronize the signal with the pipeline operation by clocking the command signal Div_cmd based on a timing signal indicating the end of each processing cycle and provided on an input line 608. This timing signal is for example asserted when a final clock phase Ena(7) of a processing cycle has been activated. The synchronized command signal Div_cmd_sync is provided on a line 610 to a computation logic circuit (COMP LOGIC) 612, which for example generates a set of enable signals Nxt_Ena(7:0).

The enable signals Nxt_Ena(7:0) load one or more logic "1" values to flip-flops 614, each associated with a corresponding one of the clock signals CLK0 to CLK7. Each flip-flop 614 is for example clocked by the master clock signal MCLK. The flip-flops 614 output the corresponding enable signals as outputs Ena(7:0), which are for example provided to enable inputs EN of corresponding clock gates (CG) 616. The clock gates 616 each receive the clock signal MCLK, and supply the clock signal at their output when their respective enable signal is at a logic "1". In this way, the clock gates respectively generate the clock signals CLK0 to CLK7 at their outputs.

The enable signals Ena(7:0) are also for example provided on a feedback path 618 back to the computation logic circuit 612. The circuit 612 for example generates the enable signals Nxt_Ena(7:0) based on the command signal Div_cmd_sync, and on the previous value of the enable signals, corresponding to the signals Ena(7:0). For example, assuming that the command signal Div_cmd_sync indicates that a processing cycle is to be spread over n clock cycles, and that there are q independent clock signals, the circuit 612 for example starts the processing cycle by asserting the enable signals Nxt_Ena(0) to Nxt_Ena((q/n)−1). If n is equal to 1, the processing cycle is then complete. If however n is greater than 1, then for the next period of the master clock, the q/n logic "1"s of the signals Ena(7:0) are shifted by q/n positions to the left to generate the signals Nxt_Ena(7:0). This for example continues until all of the clock signals have been asserted during the processing cycle, for example until the value Nxt_Ena(7) has been asserted.

In some embodiments, the clock gates 616 could be omitted, and the flip-flops 614 could directly provide the clock signals CLK0 to CLK7. However, an advantage of using clock gating is that, when the enable signals Ena(7:0) are all asserted, the frequency of the clock signals CLK0 to CLK7 will be that of the master clock MCLK, rather than being limited to half of the frequency of the master clock.

FIGS. 7A to 7D are diagrams representing the executing times of processing operations in a pipeline according to example embodiments. They assume that the pipeline has four stages: an FSM (finite state machine) stage controlling multiplexers in the pipeline to provide data D0_A or D0_B into the pipeline, a command stage CMD executing a command CMD_A on data D0_A, or a command CMD_B on data D0_B, a calculation stage CALC performing a calculation CALC_A or CALC_B, and a result stage RES storing the result RES_A or RES_B.

FIG. 7A illustrates a case in which the clock received by each stage of the pipeline is the same. In a first processing cycle C1 of the pipeline, the FSM provides data D0_A. In a second cycle C2 of the pipeline, the FSM provides data D0_B, and the CMD stage performs the command CMD_A. In a third cycle C3 of the pipeline, the CMD stage performs the command CMD_B, and the calculation stage performs the calculation CALC_A. In a fourth cycle C4, the CALC stage performs the calculation CALC_B and a result RES_A is stored. In a fifth cycle C5, the result RES_B is stored. Also in the fifth cycle, the value A stored in the operation RES_A is for example used by the FSM stage, which for example receives the value via a feedback path of the pipeline.

FIG. 7B illustrates an example in which the clock frequency has for example been reduced by two with respect to the example of FIG. 7A, and there are two clock phases, each processing cycle being spread over two clock periods.

Thus, rather than being spaced by a whole clock period, the operations through the pipeline are spaced by half a clock period. It can be seen that, in this example, the behavior of the pipeline is functionally different from that of FIG. 7A, because the result RES_A will be available on the feedback path in the third processing cycle C3 of the FSM stage, whereas data is only used in the fifth processing cycle C5 of the FSM stage. In other words, spreading the processing cycles over several clock phases creates functional hold issues in this example.

FIG. 7C illustrates a solution for reducing the impact of the functional hold issue identified in FIG. 7B. In the example of FIG. 7C, each processing cycle is spread over four clock phases, and the latest phase of each cycle, labelled PH4 in FIG. 7C, is provided to the first pipeline stage, which is the FSM stage. Furthermore, the second latest phase PH3 is provided to the second pipeline stage, which is the CMD stage, the third latest phase PH2 is provided to the third pipeline stage, which is the CALC stage, and the earliest phase PH1 is provided to the last pipeline stage, which is the RES stage. It can be seen that this choice of clock phases means that the result RES_A is available only one cycle earlier than required. There is thus at most a one clock cycle shift in behavior.

FIG. 7D illustrates a further example, similar to that of FIG. 7C, but in which the pipeline processing is modified such that data is stable one clock cycle after it is used. Thus a non-active cycle is added after the cycle C1 of the FSM in which the data D0_A is provided, and in this way the result RES_A also remains valid for the cycle C5 of the stage RES, such that it can be used by the FSM stage via the feedback path directly without any hold.

Figure 8A:
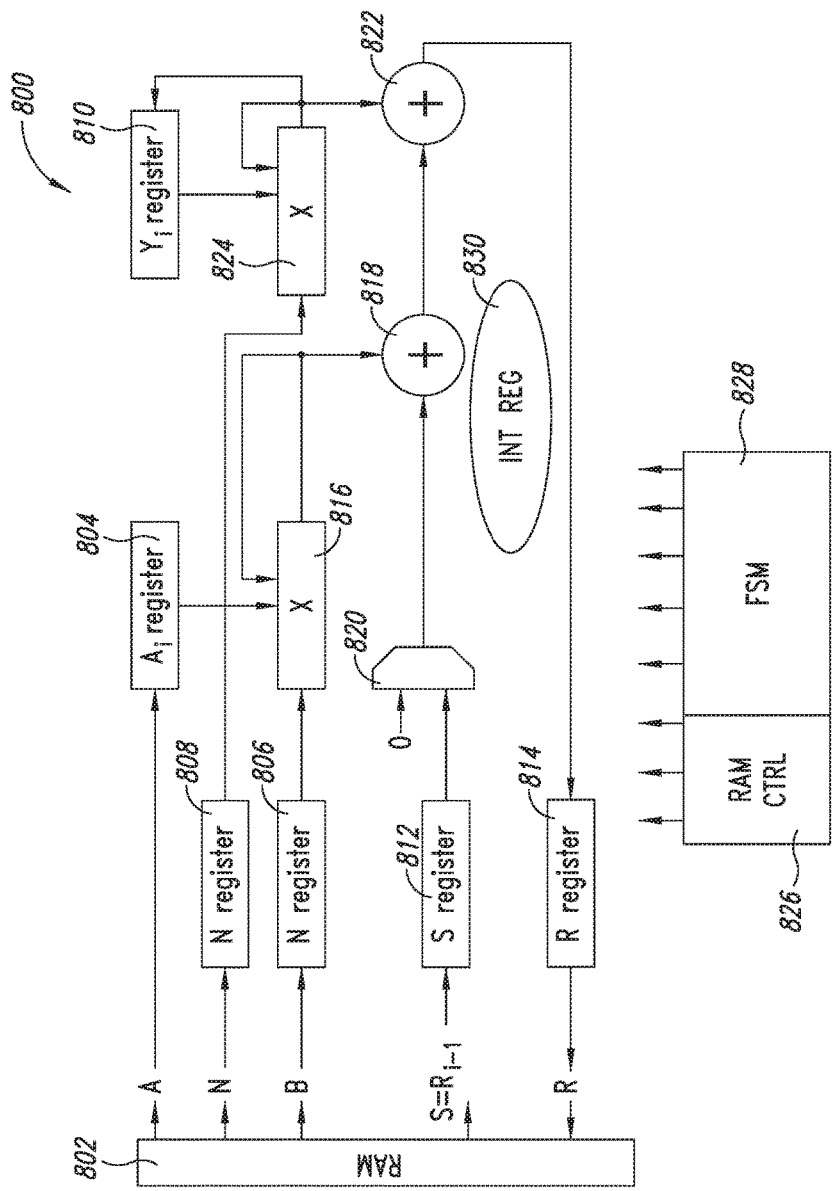
FIG. 8A schematically illustrates a circuit implementing part of the RSA cryptographic algorithm.

FIG. 8A schematically illustrates a modular arithmetic hardware accelerator according to an example embodiment. This circuit for example implements part of the RSA (Rivest, Shamir and Adleman) cryptographic algorithm, although in alternative embodiments it could have other applications, such as for an ECC (Elliptic Curve Cryptography) algorithm, or other encryption or decryption operations. The circuit of FIG. 8 for example implements part of a modular exponentiation, and in particular, a function A·B+Y·N, in other words the modular multiplication of A·B modulo N. Each data word A is for example divided into segments A, for processing. For example, the values A, B and N are the operand of the computation, and Y represents a number that allows that modulus property to be fulfilled, for example such that 0<A·B+Y·N<N. The means for computing Y will be known to those skilled in the art.

The values of $A_i$, B and N, as well as the temporary result of a previous iteration $S=R_{i-1}$ are for example stored in a memory 802, which is for example RAM (random access memory), and the temporary result R of each iteration is stored to the memory 802. In this example, S is used to accumulate former results from $A_0$ to $A_{i-1}$. R is the temporary result of the multiplications of $A_0$ to $A_i$ with B. The values of $A_i$, B, N, $Y_i$, S and R are for example stored in corresponding registers 804, 806, 808, 810, 812 and 814 respectively.

The value B, and an ith segment $A_i$ of the value A, are multiplied together by a multiplier 816. A portion of the result still depends on the next part of B, while another portion of the result is final with respect to B. The temporary result is accumulated via a feedback path back to the multiplier 816, which then performs the multiplication of the next part of B, until the whole of value B has been multiplied by value $A_i$. A final portion of the result is then progressively provided to an adder 818, to be added to a value provided by a multiplexer 820.

Similarly, the value N, and an ith segment $Y_i$ of the value Y, are multiplied together by a multiplier 824, and part of the result is provided via a feedback path back to the multiplier 824, which then performs the multiplication of the next part of N, until the whole of value N has been multiplied by value $Y_i$. The result is then provided to an adder 822, to be added to the value provided by the adder 818. The values of $Y_i$ are also stored in the $Y_i$ register 810.

The multiplexer 820 provides, on an initial iteration, a value of zero to the adder 818, and on subsequent iterations, the result S of the previous iteration.

A RAM control circuit (RAM CTRL) 826 for example controls the read and write operations to and from the memory 802, and an FSM (finite state machine) 828 for example controls the switching of data in the circuit, as will be explained in more detail with reference to FIG. 8B. An intermediate register (INT REG) 830 stores the result of the multiplication performed by the multiplier 816.

Figure 8B:
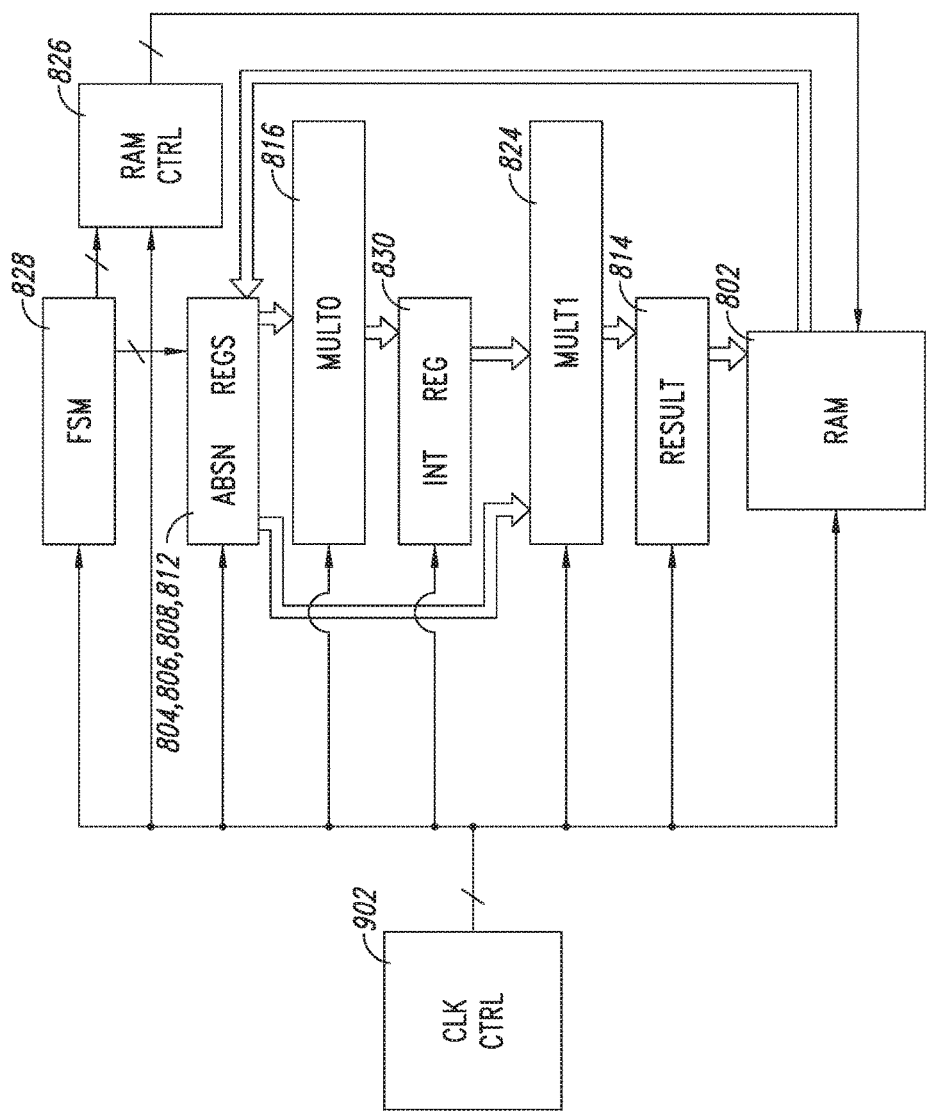
FIG. 8B schematically illustrates pipeline operation of the circuit of FIG. 8A.

FIG. 8B illustrates a pipeline formed in the circuit of FIG. 8A according to a standard approach in which each of the stages operate synchronously. The pipeline for example comprises stages corresponding to the FSM 828, the A, B, S and N registers (ABSN REGS) 804, 806, 812 and 808, the multiplier (MULT0) 816, the intermediate register (INT REG) 830, the multiplier (MULTI) 824, the register (RESULT) 814, and the memory (RAM) 802. The FSM 828 for example controls the ABSN registers and the memory control circuit (RAM CTRL) 826. The memory control circuit 826 in turn controls the RAM 802 to provide data to the ABSN registers. Each of the stages of the pipeline receives the same clock signal CLK from a clock controller (CLK CTRL) 902.

Figure 9A:
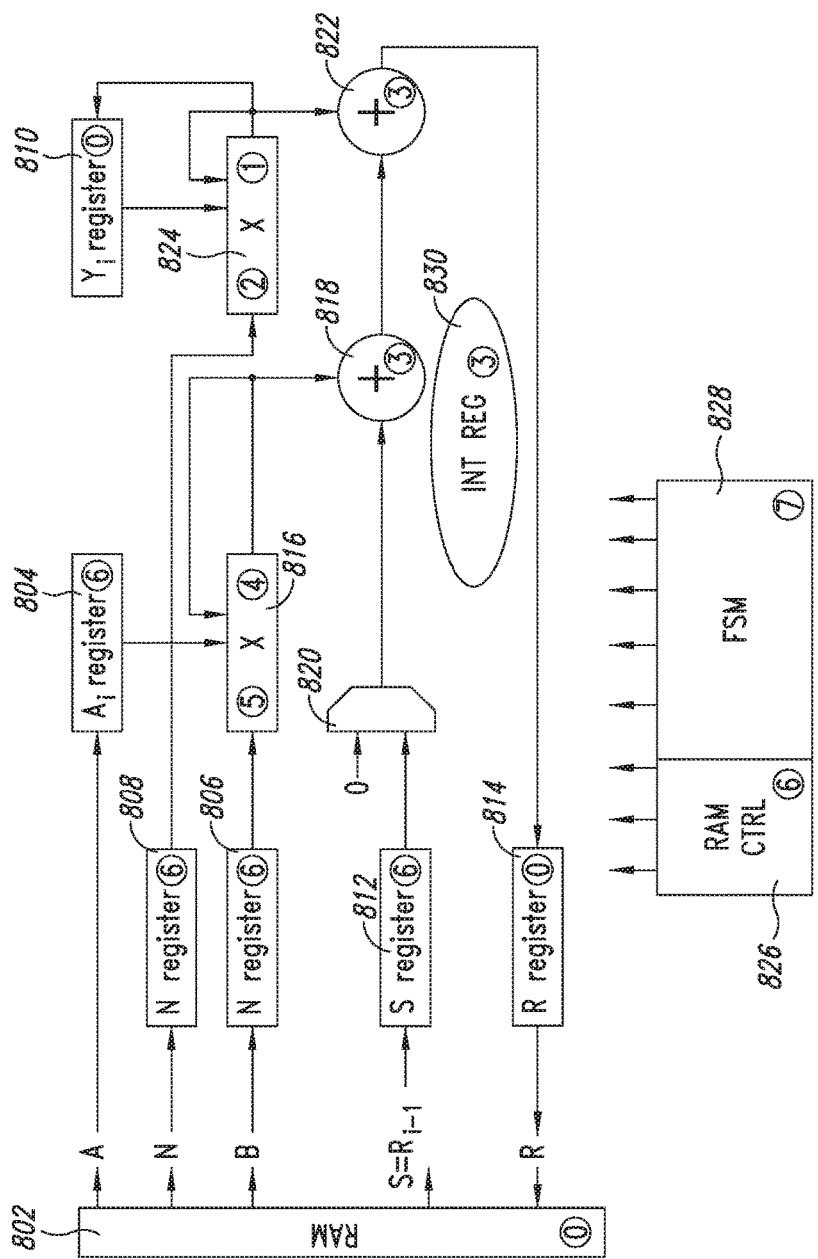
FIG. 9A schematically illustrates the circuit of FIG. 8A including an indication of execution phases according to an example embodiment of the present disclosure.
Figure 9B:
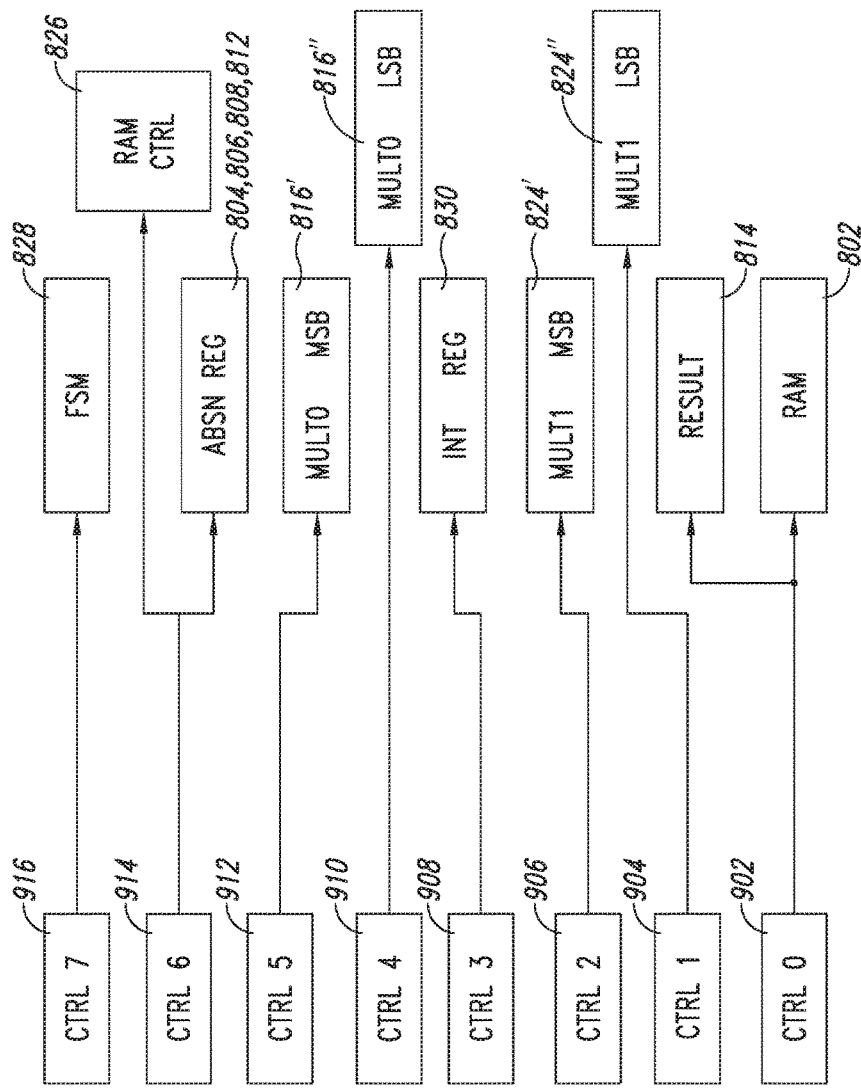
FIG. 9B schematically illustrates pipeline operation of the circuit of FIG. 9A according to an example embodiment of the present disclosure.

FIGS. 9A and 9B represent an alternative implementation of the modular arithmetic circuit of FIGS. 8A and 8B according to an example embodiment in which dynamic phase control is implemented.

The circuit of FIG. 9A is the same as that of FIG. 8A, but additionally indicates, for each pipeline stage, the clock phase that it receives.

FIG. 9B illustrates the modified pipeline, which is similar to that of FIG. 8B, but in which the multipliers 816 and 824 have been split to provide separate pipeline sub-stages. In particular, the multiplier 816 for example comprises two sub-stages corresponding to an MSB multiplier (MULT0 MSB) 816' and an LSB multiplier (MULT0 LSB) 816". The multiplier 816' for example receives the a/2 most significant bits of the value $A_i$, where a is the number of bits of the value $A_i$, and the multiplier 816" for example receives the a/2 least significant bits of the value $A_i$. The sub-stages 816', 816" are for example parallel processing blocks capable of being executed in parallel, or phase shifted with respect to each other. Similarly, the multiplier 824 for example comprises two sub-stages corresponding to an MSB multiplier (MULTI MSB) 824' and an LSB multiplier (MULTI LSB) 824". The multiplier 824' for example receives the c/2 most significant bits of the value $Y_i$, where c is the number of bits of the value $Y_i$, and the multiplier 824" for example receives the c/2 least significant bits of the value $Y_i$. The sub-stages 824', 824" are for example parallel processing blocks capable of being executed in parallel, or phase shifted with respect to each other.

Referring again to FIG. 9A, the stages of the pipeline for example each receive one of eight clock phases. The pipeline stages for example receive the phases, from the earliest phase to the latest stage, in reverse order, such the first pipeline stage receives the latest clock phase, and the last pipeline stage receives the earliest clock phase. For example, with reference to FIGS. 9A and 9B, the RAM 802 and register 814 receive the earliest clock phase 0 from a circuit (CTRL 0) 902 of a clock controller, the multiplier 824" receives the clock phase 1 from a circuit (CTRL 1) 904 of the clock controller, the multiplier 824' receives the clock phase 2 from a circuit (CTRL 2) 906 of the clock controller, the intermediate register 830 receives the clock phase 3 from a circuit (CTRL 3) 908 of the clock controller, the multiplier 816" receives the clock phase 4 from a circuit (CTRL 4) 910 of the clock controller, the multiplier 816' receives the clock phase 5 from a circuit (CTRL 5) 912 of the clock controller, the ABSN registers 804, 806, 812, 808, and the memory controller 826 receive the clock phase 6 from a circuit (CTRL 6) 914 of the clock controller, and the FSM 828 receives the clock phase 7 from a circuit (CTRL 7) 916 of the clock controller.

Thus, in the example of FIG. 9B, one or more pipeline stages of an initial data processing pipeline are split into more than one parallel sub-stages in order to create sub-stages that can be clocked by independent clock signals phase shifted with respect to each other. Advantageously, these sub-stages are parallel stages, capable of being executed in parallel without adding latency to the pipeline with respect to the original pipeline stage. Furthermore, whereas registers are for example provided for storing data between the pipeline stages of the pipeline, no such registers are for example added between the pipeline sub-stages.

For example, a method of circuit conception of a data processing pipeline comprises generating a circuit design of a data processing pipeline, for example by modifying an initial circuit design of the data processing pipeline by splitting at least one initial pipeline stage into a plurality of parallel sub-stages capable of being clocked by clock signals phase shifted with respect to each other. The circuit design also for example comprises one or more further pipeline stages clocked by corresponding independent clock signals, wherein the number of independent clock signals in the circuit design is greater than the number of pipeline stages of the initial circuit design. In other words, taking an initial circuit design of a data processing pipeline having N stages, the circuit design is for example modified by splitting one or more of the pipeline stages into a plurality of sub-stages, the pipeline stages and sub-stages being clocked by respective ones of M independent clock signals, where M>N. A method of manufacturing a data processing pipeline for example comprises manufacturing the data processing pipeline based on the circuit design.

Figure 10:
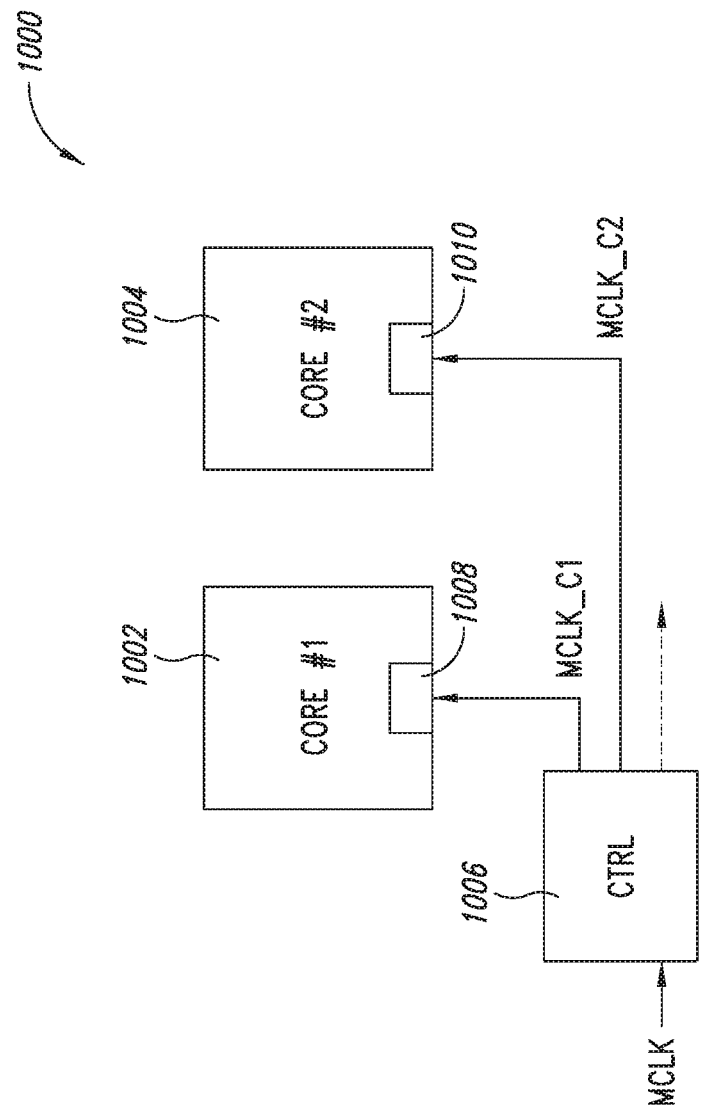
FIG. 10 schematically illustrates a multi-core processing system according to an example embodiment.

FIG. 10 schematically illustrates a multi-core processing system 1000 according to an example embodiment. The system 1000 for example comprises a core (CORE #1) 1002 and a core (CORE #2) 1004, and the system 1000 may additionally comprise further cores (not illustrated in FIG. 10). The cores 1002, 1004 for example receive master clock signals MCLK_C1, MCLK_C2 respectively, which are for example generated by a control circuit (CTRL) 1006 based on a common master clock signal MCLK. The control circuit 1006 may additionally generate further master clock signals in the case that the processing system comprises further cores.

Each core 1002, 1004 for example comprises a pipeline (not illustrated in FIG. 10) similar to that of FIG. 4, controlled by a clock controller similar to the controller 402 of FIG. 4, the clock controllers being labelled 1008 and 1010 in the cores 1002, 1004 respectively.

Each clock controller 1008, 1010 is for example capable of varying the phase of operation of one or more of the pipeline stages as described above. Additionally or alternatively, the controller 1006 is for example capable of generating the master clock signals MCLK_C1 and MCLK_C2 to be out of phase with each other, as will now be described in more detail with reference to FIG. 11.

Figure 11:
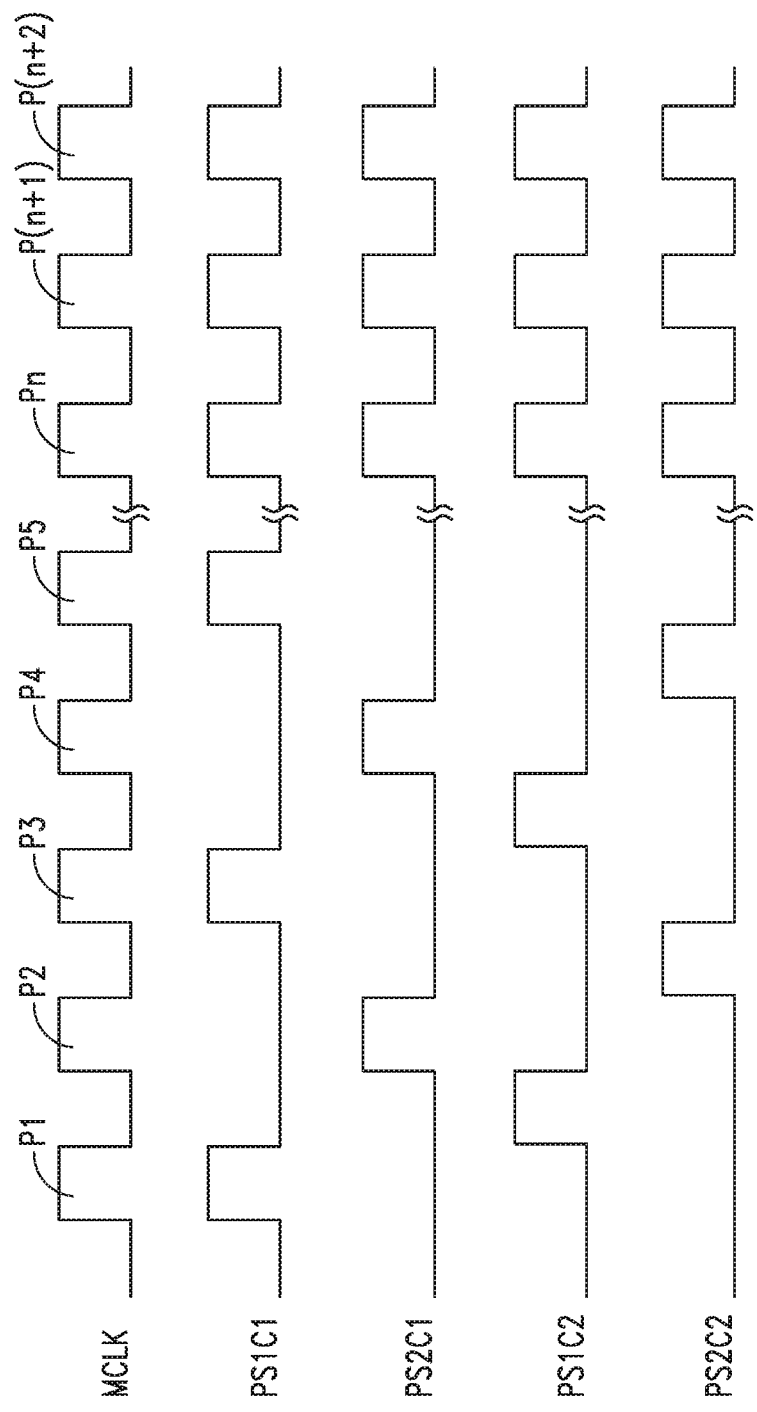
FIG. 11 is a timing diagram illustrating examples of clock signals in the processing cores of FIG. 10 according to an example embodiment.

FIG. 11 is a timing diagram illustrating examples of the common master clock signal MCLK, pipeline clock signals PS1C1, PS2C1 for driving different stages of a pipeline of the core 1002, and pipeline clock signals PS1C2, PS2C2 for driving different stages of a pipeline of the core 1004.

In the example of FIG. 11, the common master clock signal MCLK comprises pulses P1 to P5 during an initial phase. This phase for example corresponds to at least part of a start-up phase of the cores 1002, 1004.

The clock signal PS1C1 for example comprises the odd pulses P1, P3, P5, etc., of the master clock signal MCLK during the initial phase, and the clock signal PS2C1 for example comprises the even pulses P2, P4, etc., of the master clock signal MCLK during the initial phase. For example, the master clock MCLK_C1 supplied to the core 1002 corresponds to the common master clock MCLK, and the clock controller 1008 generates the signals PS1C1 and PS2C1 by selecting pulses of this master clock.

The clock signal PS1C2 for example comprises, during the initial phase, the odd pulses P1, P3, P5, etc., of the common master clock signal MCLK, each delayed by half a clock period. The clock signal PS2C2 for example comprises, during the initial phase, the even pulses P2, P4, etc., of the common master clock signal MCLK, each delayed by half a clock period. For example, the master clock MCLK_C2 supplied to the core 1004 corresponds the inverted master clock $\overline{\text{MCLK}}$, and the clock controller 1010 generates the signals PS1C2 and PS2C2 by selecting pulses of this inverted master clock.

The duration of the initial phase could be equal to fewer or a greater number of pulses of the common master clock MCLK than the five pulses shown in FIG. 11. During a subsequent phase, starting for example from an nth pulse of the master clock MCLK, the clock signals PS1C1, PS2C1, PS1C2 and PS2C2 are for example brought in phase with each to return to normal synchronous operation.

It will be apparent to those skilled in the art that the example of FIG. 11 represents only one example of how the phases of clock signals supplied to pipeline stages in the cores 1002, 1004 could be selected. There are many alternative phase combinations that could be used in alternative embodiments.

Furthermore, in some embodiments, the pipeline stages in the core 1002 could run synchronously with each other, and the pipeline stages in the core 1004 could run synchronously with each other, and a phase offset could only be applied between the master clock signals MCLK_C1, MCLK_C2 supplied to each of the cores of the multi-core processing system 1000.

An advantage of the embodiments described herein is that, by dynamically controlling the clock phase of clock signals provided to stages of a data processing pipeline, the power consumption of the pipeline can be modified dynamically. In an NFC card, spreading the power consumption over several clock phases leads to the advantage that this will lead to a smoother current demand, thereby helping to avoid a situation in which the current consumption will be seen at the antenna. In cryptographic circuits, spreading the power consumption over several clock phases can help prevent side channel attacks based on the consumption of the circuit, particularly if the clock phases provided to the pipeline stages are modified in a dynamic fashion from one data processing cycle to the next. In other circuits, such as a multi-core processor, spreading the power consumption over several clock phases can avoid spikes in the supply current, which could cause a steep drop in the supply voltages present on the supply voltage rails of the cores.

An advantage of the implementation of the RSA algorithm of FIGS. 9A and 9B is that, by splitting one or more multiplication operations into separate pipeline stages and controlling these pipeline stages to be executed on different clock phases, the power consumption on each clock phase can be significantly reduced. Indeed, multiplication operations tend to be relatively power consuming.

Having thus described at least one illustrative embodiment, various alterations, modifications and improvements will readily occur to those skilled in the art. For example, while FIGS. 8A, 8B, 9A and 9B illustrate a specific implementation of part of the RSA algorithm, it will be apparent to those skilled in the art that the principles described in relation thereto could be applied to other types of circuits.

Furthermore, it will be apparent to those skilled in the art that the various features described in relation to the various embodiments could be combined, in alternative embodiments, in any combination. For example, the dynamic operation described in relation with FIG. 5B could be applied to the RSA embodiment of FIGS. 9A and 9B.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic device having a data processing pipeline, comprising:
a first pipeline stage configured to receive a first clock signal and configured to perform a first operation triggered by a plurality of first timing edges of the first clock signal;
a second pipeline stage configured to receive a second clock signal and configured to perform a second operation triggered by a plurality of second timing edges of the second clock signal; and
a clock controller configured to generate the first and second clock signals, wherein the clock controller is capable of operating:
in a first mode in which, during a first data processing cycle of the data processing pipeline, a first of the plurality of first timing edges is in-phase with a first of the plurality of second timing edges; and
in a second mode in which, during a second data processing cycle of the data processing pipeline, a second of the plurality of first timing edges is out of phase with a second of the plurality of second timing edges, wherein in the second mode, the second data processing cycle is spread over N clock phases, where N is between 2 and P, where P is an integer representing how many pipeline stages are in the data processing pipeline.

2. The electronic device having the data processing pipeline of claim 1, wherein the clock controller is configured to generate the first and second clock signals based on a master clock signal.

3. The electronic device having the data processing pipeline of claim 2, wherein:
when in the first mode, the clock controller is configured to select a first timing edge of the master clock signal to form the first of the first and second pluralities of timing edges; and
when in the second mode, the clock controller is configured to select a second timing edge of the master clock signal to form the second of the plurality of first timing edges of the first clock signal and to select a third timing edge of the master clock signal to form the second of the plurality of second timing edges of the second clock signal.

4. The electronic device having the data processing pipeline of claim 3, wherein the clock controller comprises:
a computation circuit, the computation circuit adapted to generate:
a first enable signal for selecting the second timing edge of the master clock signal to form the second of the plurality first timing edges of the first clock signal; and
a second enable signal for selecting the third timing edge of the master clock signal to form the second of the plurality of second timing edges of the second clock signal.

5. The electronic device having the data processing pipeline of claim 4, wherein the computation circuit is adapted to generate current values of the first and second enable signals based on previous values of the first and second enable signals and based on a clock division factor.

6. The electronic device having the data processing pipeline of claim 1, wherein the first pipeline stage comprises:
an output coupled to an input of the second pipeline stage, wherein during the second data processing cycle of the data processing pipeline the clock controller is adapted to generate the second of the plurality of first timing edges of the first clock signal to occur at a first time instant and further adapted to generate the second of the plurality of second timing edges of the second clock signal to occur at a second time instant, the second time instant earlier than the first time instant.

7. The electronic device having the data processing pipeline of claim 1, wherein the electronic device is a near field communications (NFC) card, and wherein the clock controller is further adapted to control a clock period of the first and second clock signals based on power available to the NFC card.

8. The electronic device having the data processing pipeline of claim 1, wherein the electronic device is a cryptographic circuit, and wherein during the second data processing cycle, a first J stages of the pipeline receive the first clock signal, and a second K stages of the pipeline receive the second clock signal, and during a third data processing cycle, a first L stages of the pipeline receive the first clock signal, and a second M stages of the pipeline receive the second clock signal, where J, K, L, and M are each integers equal to 1 or more, and J and L are non-equal.

9. The electronic device having the data processing pipeline of claim 1, wherein the electronic device is a modular arithmetic hardware accelerator, and wherein the first and second pipeline stages implement a multiplication operation.

10. A multi-core processor, comprising:
a first core, the first core having a first data processing pipeline configured to receive a first master clock signal and configured to perform a first operation triggered by a plurality of first timing edges of the first master clock signal;
a second core, the second core having a second data processing pipeline configured to receive a second master clock signal and configured to perform a second operation triggered by a plurality of second timing edges of the second master clock signal; and
a clock control circuit configured to supply the first master clock signal to the first core and the second master clock signal to the second core, wherein at least some of the clock edges of the first and second master clock signals are out of phase with each other, wherein the clock control circuit is arranged to operate in a first mode in which, during a first data processing cycle of the first core, a first of the plurality of first timing edges is in-phase with a first of the plurality of second timing edges, and wherein the clock control circuit is arranged to operate in a second mode in which, during a second data processing cycle of the second core, a second of the plurality of first timing edges is out of phase with a second of the plurality of second timing edges, and wherein in the second mode, the clock control circuit is adapted to spread the second data processing cycle over N clock phases, where N is between 2 and P, where P is an integer representing a total number of pipeline stages in the second data processing pipeline.

11. The multi-core processor of claim 10, wherein at least one of the first core and the second core is arranged to perform functions of a near field communications (NFC) card, and wherein the clock control circuit is arranged to control a clock period of at least one of the first and second master clock signals based on power available to the NFC card.

12. The multi-core processor of claim 10, wherein at least one of the first core and the second core is arranged to perform functions of a modular arithmetic hardware accelerator, and wherein at least one of the first core and the second core is arranged to implement a multiplication operation.

13. A data processing pipeline circuit design method, comprising:
modifying an initial circuit design of a data processing pipeline by splitting an initial pipeline stage into two parallel pipeline sub-stages, the two parallel pipeline sub-stages including:
a first pipeline stage configured to perform a first operation triggered by first timing edges of a first clock signal; and
a second pipeline stage configured to perform a second operation triggered by second timing edges of a second clock signal, the second clock signal independent of the first clock signal; and
integrating the modified initial circuit design with a clock controller configured to generate the first and second clock signals, wherein the clock controller is arranged to operate:
in a first mode in which, during a first data processing cycle of the data processing pipeline, a first of the first timing edges is in-phase with a first of the second timing edges; and
in a second mode in which, during a second data processing cycle of the data processing pipeline, a second of the first timing edges is out of phase with a second of the second timing edges, wherein in the second mode, the second data processing cycle is spread over N clock phases, where N is between 2 and P, where P is an integer representing how many pipeline stages are in the data processing pipeline.

14. The data processing pipeline circuit design method of claim 13, comprising:
further integrating the modified initial circuit design with one or more further pipeline stages clocked by corresponding independent clock signals, wherein a total quantity of independent clock signals in the data processing pipeline circuit design is greater than a total quantity of pipeline stages of the initial circuit design of the data processing pipeline.

15. A method of dynamically controlling a data processing pipeline, comprising:
generating, by a clock controller, first and second clock signals from a master clock signal;
providing the first clock signal to a first pipeline stage configured to perform a first operation triggered by first timing edges of the first clock signal;
providing the second clock signal to a second pipeline stage configured to perform a second operation triggered by second timing edges of the second clock signal;
operating the clock controller in a first mode in which, during a first data processing cycle of the data processing pipeline, one or more of the first timing edges are in phase with one or more of the second timing edges; and
operating the clock controller in a second mode in which, during a second data processing cycle of the data processing pipeline, the second data processing cycle is spread over N clock phases, where N is between 2 and P, where P is an integer representing a total number of pipeline stages in the data processing pipeline, and one or more of the first timing edges are out of phase with respect to one or more of the second timing edges.

16. The method of dynamically controlling the data processing pipeline of claim 15, comprising:
when operating the clock controller in the first mode, selecting a first timing edge of the master clock signal to form the first of the first and second timing edges; and
when operating the clock controller in the second mode, selecting a second timing edge of the master clock signal to form the second of the first timing edges of the first clock signal and selecting a third timing edge of the master clock signal to form the second of the second timing edges of the second clock signal.

* * * * *